(12) United States Patent
Djordjevic et al.

(10) Patent No.: US 10,545,955 B2
(45) Date of Patent: Jan. 28, 2020

(54) METHODS AND SYSTEMS FOR GENERATING, BY A VISUAL QUERY BUILDER, A QUERY OF A GENOMIC DATA STORE

(71) Applicant: Seven Bridges Genomics inc., Cambridge, MA (US)

(72) Inventors: Dragan Djordjevic, Belgrade (RS); Filip Jelic, Belgrade (RS); Dragan Bajcic, Belgrade (RS); Jovan Cejovic, Belgrade (RS); Adam Stanojevic, Belgrade (RS); Milos Nesic, Belgrade (RS); Jelena Radenkovic, Belgrade (RS); Vladimir Mladenovic, Belgrade (RS)

(73) Assignee: SEVEN BRIDGES GENOMICS INC., Charlestown, MA (US)

( * ) Notice: Subject to any disclaimer, the term of this patent is extended or adjusted under 35 U.S.C. 154(b) by 201 days.

(21) Appl. No.: 15/405,474

(22) Filed: Jan. 13, 2017

(65) Prior Publication Data

US 2017/0206242 A1 Jul. 20, 2017

Related U.S. Application Data

(60) Provisional application No. 62/279,131, filed on Jan. 15, 2016, provisional application No. 62/332,022, filed on May 5, 2016.

(51) Int. Cl.
G06F 16/242 (2019.01)
G06F 16/248 (2019.01)
G06F 16/28 (2019.01)

(52) U.S. Cl.
CPC ........ G06F 16/2428 (2019.01); G06F 16/248 (2019.01); G06F 16/288 (2019.01)

(58) Field of Classification Search
CPC ................................................ G06F 16/2428

(Continued)

(56) References Cited

U.S. PATENT DOCUMENTS 7,877,367 B2 * 1/2011 Ross ................ G06F 17/30392
707/705
8,214,401 B2 7/2012 Rao et al.
(Continued)

FOREIGN PATENT DOCUMENTS

WO 2016024955 A1 2/2016

OTHER PUBLICATIONS

Hogenboom, Frederik, et al. "RDF-GL: a SPARQL-based graphical query language for RDF." Emergent Web Intelligence: Advanced Information Retrieval. Springer, London, 2010. 87-116. (Year: 2010).*

(Continued)

*Primary Examiner* — William Spieler
(74) *Attorney, Agent, or Firm* — Cynthia M. Gilbert; Blueshift IP LLC

(57) ABSTRACT

A method for generating a query of a genomic data store includes receiving, by a query generator executing on a computing device, from a graphical user interface, an identification of a first entity of a first entity class for inclusion in a resource description framework (RDF) query. The method includes receiving from the graphical user interface, an identification of a second entity of the first entity class, the second entity having a bi-directional relationship with the first entity. The method includes automatically generating an RDF query based upon the received identification of the first entity and the received identification of the second entity. The method includes executing the RDF query to select, from a plurality of genomic data sets, at least one genomic data set for at least one patient cohort. The method includes providing a listing of genomic data sets resulting from executing the RDF query.

16 Claims, 8 Drawing Sheets

(58) Field of Classification Search
USPC .......................................................... 707/722
See application file for complete search history.

(56) References Cited

U.S. PATENT DOCUMENTS

| | | | |
|---|---|---|---|
| 8,429,179 B1 | 4/2013 | Mirhaji | |
| 8,489,649 B2 | 7/2013 | Yalamanchi et al. | |
| 8,983,993 B2 | 3/2015 | Senart et al. | |
| 8,984,002 B2 | 3/2015 | Moon et al. | |
| 9,128,996 B2 | 9/2015 | Werner et al. | |
| 9,342,556 B2 | 5/2016 | Bhatia et al. | |
| 9,390,127 B2 | 7/2016 | Bhatia et al. | |
| 9,542,444 B2 | 1/2017 | Duan et al. | |
| 9,569,733 B2 | 2/2017 | Nassar et al. | |
| 2002/0073080 A1* | 6/2002 | Lipkin | G06F 17/30867 |
| 2007/0150495 A1 | 6/2007 | Koizumi et al. | |
| 2009/0077094 A1* | 3/2009 | Bodain | G06F 17/30734 |
| 2010/0063982 A1 | 3/2010 | Lawrence | |
| 2010/0223295 A1* | 9/2010 | Stanley | G06F 17/30595 707/794 |
| 2011/0078166 A1* | 3/2011 | Oliver | G06F 17/30864 707/760 |
| 2013/0262501 A1* | 10/2013 | Kuchmann-Beauger | G06F 17/30958 707/769 |
| 2014/0046696 A1* | 2/2014 | Higgins | G06F 19/3456 705/3 |
| 2014/0129583 A1* | 5/2014 | Munkes | G06F 16/9032 707/760 |
| 2014/0143280 A1 | 5/2014 | Duan et al. | |
| 2014/0156638 A1* | 6/2014 | Joshi | G06F 17/30566 707/722 |
| 2015/0046180 A1* | 2/2015 | Futscher de Deus | G06Q 50/24 705/2 |
| 2015/0081711 A1 | 3/2015 | Harris et al. | |
| 2015/0286730 A1 | 10/2015 | Khosravy | |
| 2015/0347471 A1 | 12/2015 | Hu et al. | |
| 2016/0070819 A1 | 3/2016 | Söderberg | |
| 2016/0224645 A1 | 8/2016 | Dang | |
| 2016/0224893 A1 | 8/2016 | Parker et al. | |
| 2017/0046349 A1 | 2/2017 | Shankar et al. | |
| 2017/0046484 A1* | 2/2017 | Buckler | G06F 19/321 |
| 2017/0083547 A1 | 3/2017 | Tonkin et al. | |
| 2017/0139984 A1* | 5/2017 | Bordawekar | G06F 17/30401 |
| 2017/0140044 A1 | 5/2017 | Sweeney et al. | |
| 2017/0185674 A1* | 6/2017 | Tonkin | G06F 17/30734 |

OTHER PUBLICATIONS

Chiba, Hirokazu, Hiroyo Nishide, and Ikuo Uchiyama. "Construction of an ortholog database using the semantic web technology for integrative analysis of genomic data." PloS one10.4 (2015): e0122802. (Year: 2015).*

Chen, 2013, Semantic web meets integrative biology: a survey, Briefings in Bioinformatics 14(1):109-125.

Deus, 2010, Exposing the Cancer Genome Atlas as a SPARQL Endpoint, J Biomed Inform. 43(6): 998-1008.

Keenan, 2015, Comparison of the genomic landscape between primary breast cancer in african american versus white women and the association of racial differences with tumor recurrence. Journal of Clinical Oncology 33(31):3621-3627.

Loizou and Grath, 2013, On the formulation of performant SPARQL queries, CoRR abs/1304.0567.

Papailiou, 2015, Graph-Aware, Workload-Adaptive SPARQL Query Caching, SIGMOD '15 ACM, pp. 1777-1792.

Saleem, 2013, Fostering Serendipity through Big Linked Data, Semantic Web Challenge at ISWC 2013.

Schweiger, 2014, SPARQLGraph: a web-based platform for graphically querying biological Semantic Web databases, BMC Bioinformatics 15:279.

Wilks, 2014, The Cancer Genomics Hub (CGHUB): overcoming cancer through the power of torrential data, Database 2014 1-10.

Zhu, 2014, TCGA-Assembler: An Open-Source Pipeline for TCGA Data Downloading, Assembling, and Processing, Nature Methods 11(6):599-600.

* cited by examiner

METHODS AND SYSTEMS FOR GENERATING, BY A VISUAL QUERY BUILDER, A QUERY OF A GENOMIC DATA STORE

CROSS-REFERENCE TO RELATED APPLICATIONS

This application claims priority from U.S. Provisional Patent Application Ser. No. 62/279,131, filed on Jan. 15, 2016, entitled "Visual Query Builder for Genomic Data Store," and from U.S. Provisional Patent Application Ser. No. 62/332,022, filed on May 5, 2016, entitled "Visual Querying of Cancer Genomics Data using the Semantic Web," each of which is hereby incorporated by reference.

STATEMENT REGARDING FEDERALLY SPONSORED RESEARCH OR DEVELOPMENT

This invention was made with government support under Contract No. HHSN261201400008C awarded by the National Institutes of Health. The government has certain rights in the invention.

BACKGROUND

The disclosure relates to generating queries. More particularly, the methods and systems described herein relate to generation, by a visual query builder, of a query of a genomic data store.

Conventional models for genomic data analysis typically require downloading large genomic data sets, incorporating new locally generated data, and then performing computational analyses on this data using local hardware. This model has been successfully employed by researchers for many years, but recently presents a bottleneck given the enormous growth in size of biomedical data sets. Large-scale scientific programs using next-generating sequencing technology, such as the 1000 Genomes Project, the Human Microbiome Project (HMP), and The Cancer Genome Atlas (TCGA), have grown to a point in which it is impractical for individual researchers to download, store, and analyze common genomic data sets. For example, the full size of the TCGA data set is expected to exceed over 2.5 Petabytes of data. Few researchers have this level of storage capacity, and for those who do, simply downloading this amount of data could take months over a conventional network connection.

To address this issue, the research community has focused on the creation of public cloud computing resources that allow researchers from anywhere in the world to access, contribute to, and analyze a shared data set. Analysis tools are co-located with the data via the cloud computing resource, and researchers may upload or design their own. In this way, the analysis tools are brought to the data, rather than downloading the data to perform analysis with local tools. This paradigm is expected to improve data accessibility and analysis for a diverse community of users. However, the implementation of such cloud computing resources requires skill and careful planning, leading to new issues regarding data access, computing capacity, interoperability, training, usability, and governance.

One particular issue affecting meaningful analysis of large genomic data sets is the diversity of the data. Each file from a study may represent a variety of raw and processed data, such as from whole genome, whole exome, RNA, micro-RNA, bisulfite, array, and other forms of analyses. Data can be unprocessed (such as sequence reads or intensity data), or processed (such as alignments or a list of variants), each of which may be stored in a variety of formats. Further, various metadata and attributes may be associated with each data point, including clinical information about the patient, processing information related to samples, and the type of genomic analyses performed. For example, the TCGA data set includes metadata for each patient that includes rich information regarding treatment protocols, follow ups, and detailed processing information for each sample at the aliquot level. Organizing and presenting this information in an appropriate way to allow for meaningful query and selection is a challenging task.

Diverse meta-elements can be better managed using a semantic model. The Semantic Web has already been used for the purpose of organizing biological datasets. For example, Open PHACTS aims to improve drug discovery efforts by integrating and linking major pharmacological datasets. Previous work on structuring and exposing TCGA data includes an adaptation to a Simple Sloppy Semantic Database (S3DB) management model, including a scalable approach to continuous data integration and visual environment for biomedical data understanding and discovery. However, querying such solutions is still not an intuitive process for users.

One way to improve accessibility to such data is to use a visual query browser. For example, the visual query browser can be used to visually create SPARQL Protocol and RDF Query Language (SPARQL) queries, allowing researchers and other users to query a Resource Description Framework (RDF) store in an interactive manner. Previous attempts at creating visual query browsers for RDF stores typically require a level of expertise that poses challenges for users. For example, U.S. Pat. No. 8,984,002 describes a query builder system that allows a user to visually build an RDF query using a drag-and-drop interface by selecting classes and predicates to form the query. (See, e.g., U.S. Pat. No. 8,984,002, FIG. 3.) The SPARQL query is built, line by line, by incrementally generating the query statements that make up the query. (Id., col. 8, lines 49-56.) However, this approach is still not immediately intuitive for the user, who must still have knowledge of the intricacies of RDF format and SPARQL queries, which conventional users do not necessarily have.

BRIEF SUMMARY

In one aspect, a method for generating, by a query generator, a query of a genomic data store includes receiving, by a query generator executing on a computing device, from a graphical user interface, an identification of a first entity of a first entity class for inclusion in a resource description framework (RDF) query. The method includes receiving, by the query generator, from the graphical user interface, an identification of a second entity of the first entity class having a bi-directional relationship with the first entity. The method includes automatically generating an RDF query based upon the received identification of the first entity and the received identification of the second entity. The method includes executing the RDF query to select, from a plurality of genomic data sets, at least one genomic data set for at least one patient cohort. The method includes providing a listing of genomic data sets resulting from executing the RDF query.

BRIEF DESCRIPTION OF THE DRAWINGS

Certain objects, aspects, features, and advantages of the disclosure will become more apparent and better understood by referring to the following description taken in conjunction with the accompanying drawings, in which.

DETAILED DESCRIPTION

In some embodiments, the methods and systems described herein relate to generating, by a query generator, a query of a genomic data store. Before describing these methods and systems in detail, however, a description is provided of a network in which such methods and systems may be implemented.

Figure 1A:
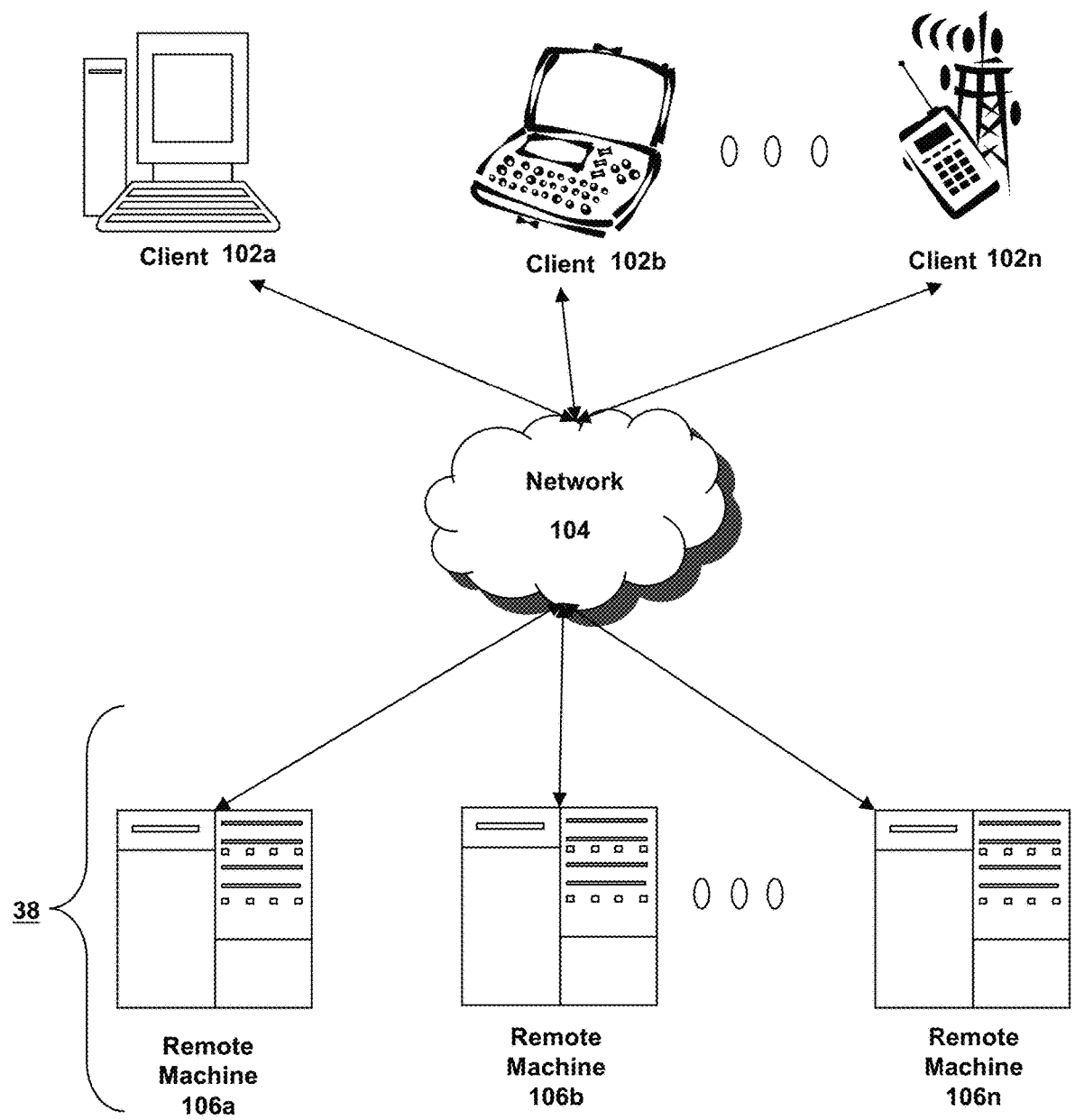
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, machine(s) 102, endpoint(s) 102, or endpoint node(s) 102) in communication with one or more remote machines 106a-106n (also generally referred to as server(s) 106, machine(s) 106, or computing device(s) 106) via one or more networks 104.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems, of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
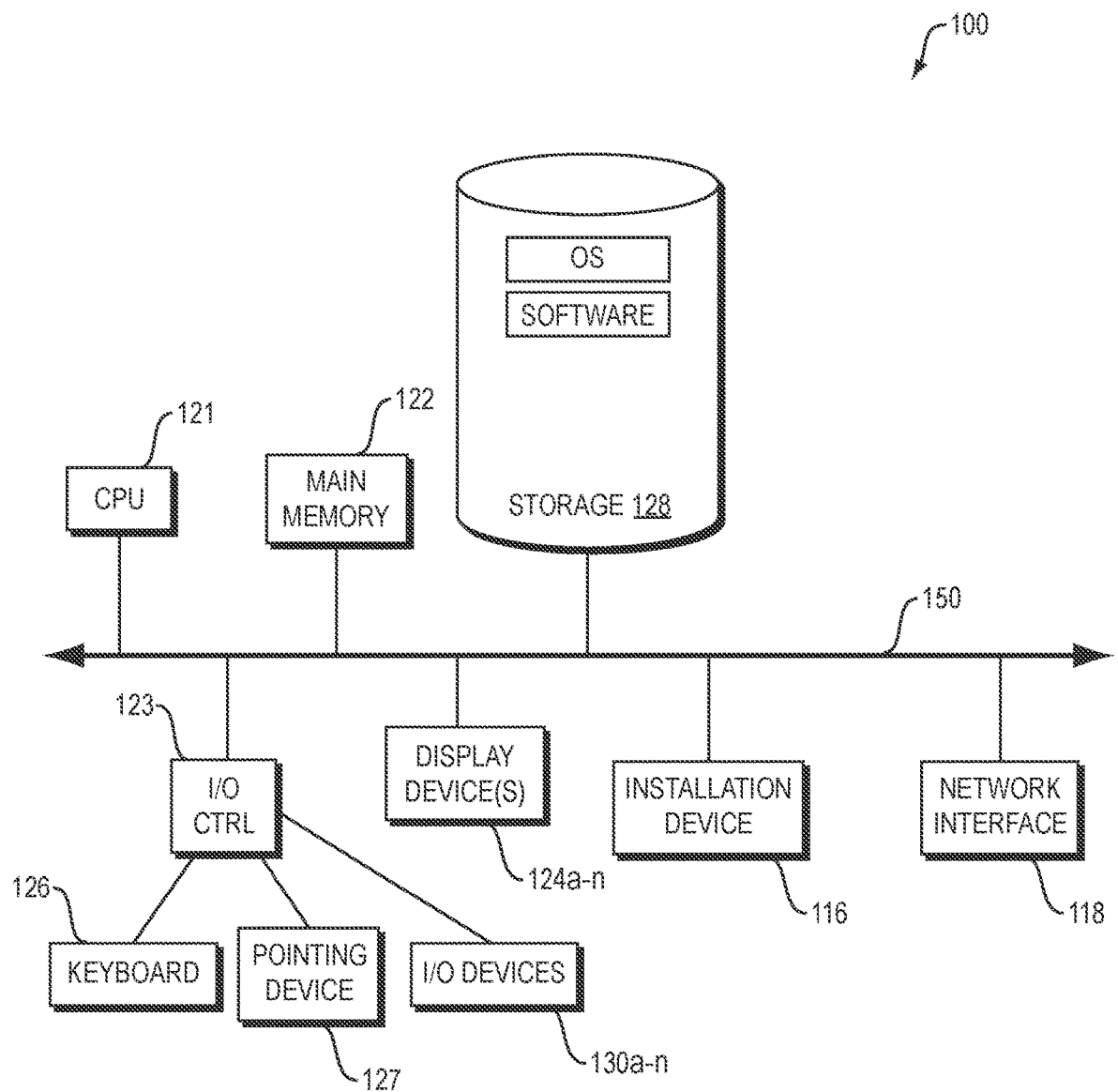
Figure 1C:
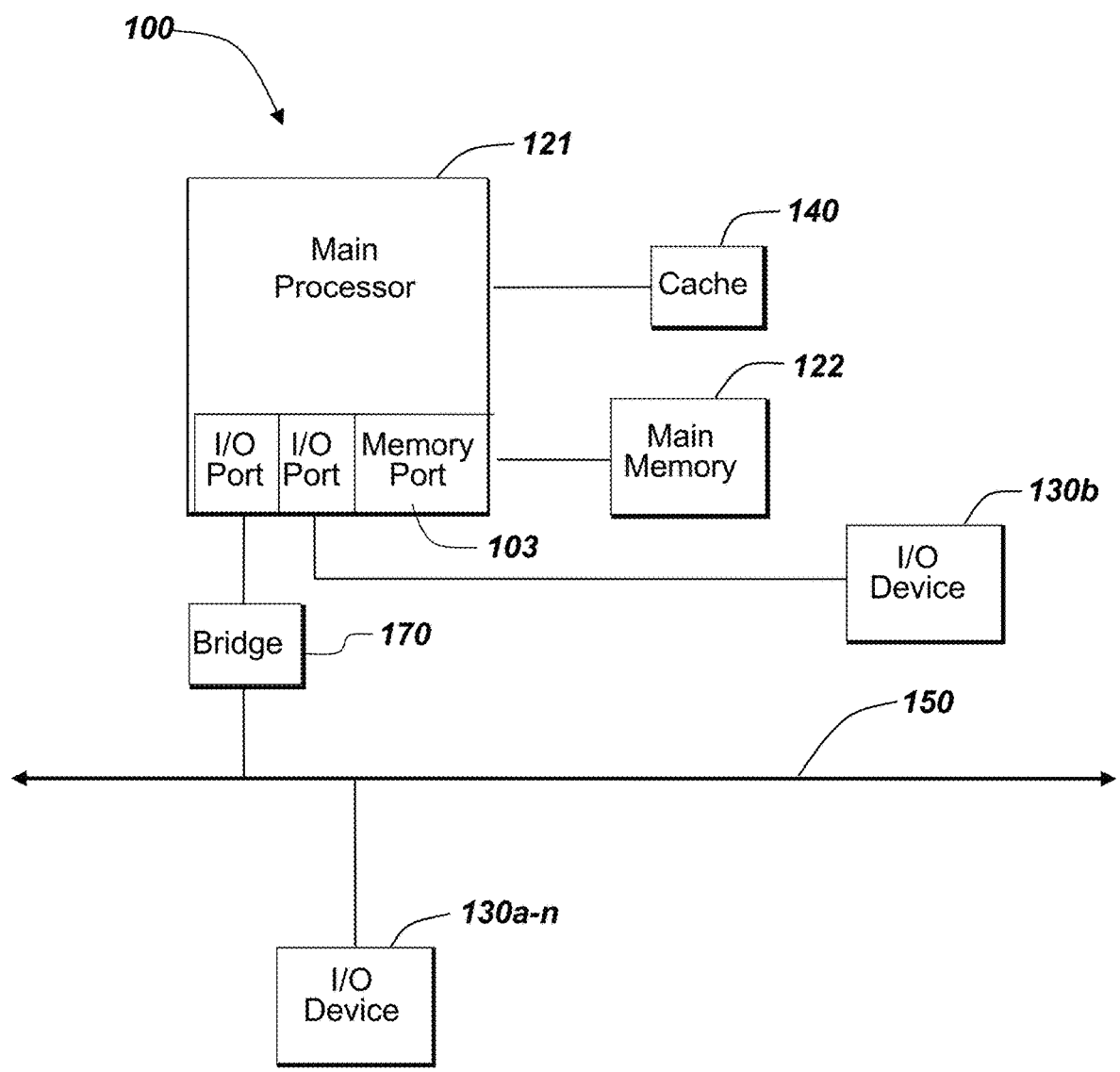

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7 and WINDOWS VISTA, all of which are manufactured by Microsoft Corporation of Redmond, Wash.; MAC OS, manufactured by Apple Inc. of Cupertino, Calif.; OS/2, manufactured by International Business Machines of Armonk, N.Y.; or any type and/or form of a UNIX operating system.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc. of Cupertino, Calif. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., Motorola Inc. of Schaumburg, Ill., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is device in the IPHONE smartphone line of devices, manufactured by Apple Inc. of Cupertino, Calif. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices, manufactured by Apple Inc.; the PLAYBOOK, manufactured by Research in Motion; the CRUZ line of devices, manufactured by Velocity Micro, Inc. of Richmond, Va.; the FOLIO and THRIVE line of devices, manufactured by Toshiba America Information Systems, Inc. of Irvine, Calif.; the GALAXY line of devices, manufactured by Samsung; the HP SLATE line of devices, manufactured by Hewlett-Packard; and the STREAK line of devices, manufactured by Dell, Inc. of Round Rock, Tex.

In one embodiment, the methods and systems described herein provide functionality for generating, by a visual query builder, a query of a genomic data store.

One way to integrate disparate data sources and enable searching and discovery is to define an ontology for those data. An ontology is a formalized vocabulary of terms covering a specific domain. An ontology specifies the definitions of terms by describing their relationships with other terms in the ontology. Ontologies can be defined for data and metadata associated with genomic data sets in order to reduce complexity and to better organize information, allowing for efficient searching and analysis.

For example, for a genomic data set, an ontology can be defined for the metadata by defining a vocabulary of terms or entities, and relationships between. Both entities and relationships can be inferred from the underlying metadata. Entities may be represented by nodes in a graph and the relationships between entities may be represented by edges in a graph. Ontologies can be quite complex, exhibiting a variety of interrelated terms.

As previously noted, one complex genomic and clinical dataset is TCGA. Building a data ontology for TCGA includes the identification of relevant concepts in data and metadata, which must then be modelled into a data ontology through the proper annotation of entities and their properties and relationships. This data may initially come from multiple sources, such as TCGA Data Portal, the Cancer Genomics Hub, and the Genomics Data Commons, and be provided in different formats, such as XML, TSV, and CSV.

In one embodiment, a process for building a data ontology for use with the methods and systems described herein may include the annotation of entities and their properties and relationships. In one embodiment, there are a plurality of distinct groups of domain entities, each modelled with corresponding classes. For example, a first entity class may describe entities with a central role in analysis and investigation. For example, when building a TCGA data ontology according to an embodiment of the disclosure, this first entity class may be referred to as "TCGAEntity." Examples of entities in the first entity class may include patients (participants, cases), their clinical data (radiation and drug therapy, follow up, new tumor event), biospecimen data (sample, portion, slide, analyte and aliquot), and associated data files as physical carriers of information for all previously mentioned entities. Each of these entities (e.g., case, sample, file) may be modelled as subclasses of the first entity class (TCGAEntity) and their instances may possess unique identifiers.

As another example, a second entity class may model entities used to describe, explain, quantify or categorize instances of the elements of the first entity class. Instances of these classes may be used, for example, to denote disease or gender of a patient, the sample type for a sample, or the data format of a file. In other words, instances of the second class represent properties or attributes of linked instances of the first class. Each of these classes may be or include a set of well known, community recognized, enumerated list type values in their appropriate domain. In the TCGA data ontology according to an embodiment of the disclosure, this second entity class may be referred to as "TCGAUtility".

Relationships between instances of classes may be modelled in a variety of ways. For example, using the Ontology Web Language (OWL) vocabulary, relationships between classes may be modelled as Object Properties. Such relationships include those between entities of the first entity class, such as when a File contains data for a Sample, or when a Case has an associated Sample. Object Properties may also be utilized to associate instances from the first entity class with instances from the second entity class (e.g., to define a Disease for a Case, Data Format for a File, Sample Type for a Sample). Properties of entities responsible for literal data, such as identifiers, labels, or values (e.g., barcodes, file names, amounts, concentrations) may be modelled as Datatype Properties. In certain embodiments, ontology and RDF data may be constructed using a combination of RDF, RDFS and OWL vocabularies. The Protege10 framework and the Python library rdib11 Python may be used to edit and engineer the ontologies.

Once an ontology has been defined, metadata can be stored using a Resource Description Framework (RDF) graph, allowing the metadata to be searched and accessed according to the defined entities and relationships. Graphs are a powerful and flexible tool for representing linked data. The Resource Description Framework is a data model that graphically represents semantic data as a collection of triple statements, or "triples." Each triple has a subject, a predicate, and an object, each of which may be identified using, as a non-limiting example, a Uniform Resource Identifier (URI). The triple forms a directed, labeled graph, wherein nodes represent the subject and predicate, and a directed edge between the subject and predicate identifies the relationship between the two. An assertion of a triple says that a relationship, indicated by the predicate, holds true between the entities denoted by the subject and object of the triple. For example, a triple in the TCGA data set can represent that a patient received a drug therapy, i.e.: "Case hasDrugTherapy DrugTherapy". By defining these relationships, data can be processed outside the particular environment in which it was created, leading to opportunities for combining data from several applications to arrive at new information.

Triples can be stored in an RDF-compatible graph database or RDF store. Applications supporting this format typically operate as an embedded database, or over a client/server application programming interface (API). Once all triples from a data set have been defined, the RDF store may then be queried using an appropriate query language, such as SPARQL (SPARQL Protocol and RDF Query Language). However, as indicated above, while SPARQL provides an elegant way to efficiently access data stored within an RDF store, it is not immediately accessible to most researchers. Writing queries in SPARQL can be challenging, as it requires knowledge of namespaces, how to find constants in expressions, remembering filter syntax, and understanding the structure of the query.

Figure 2A:
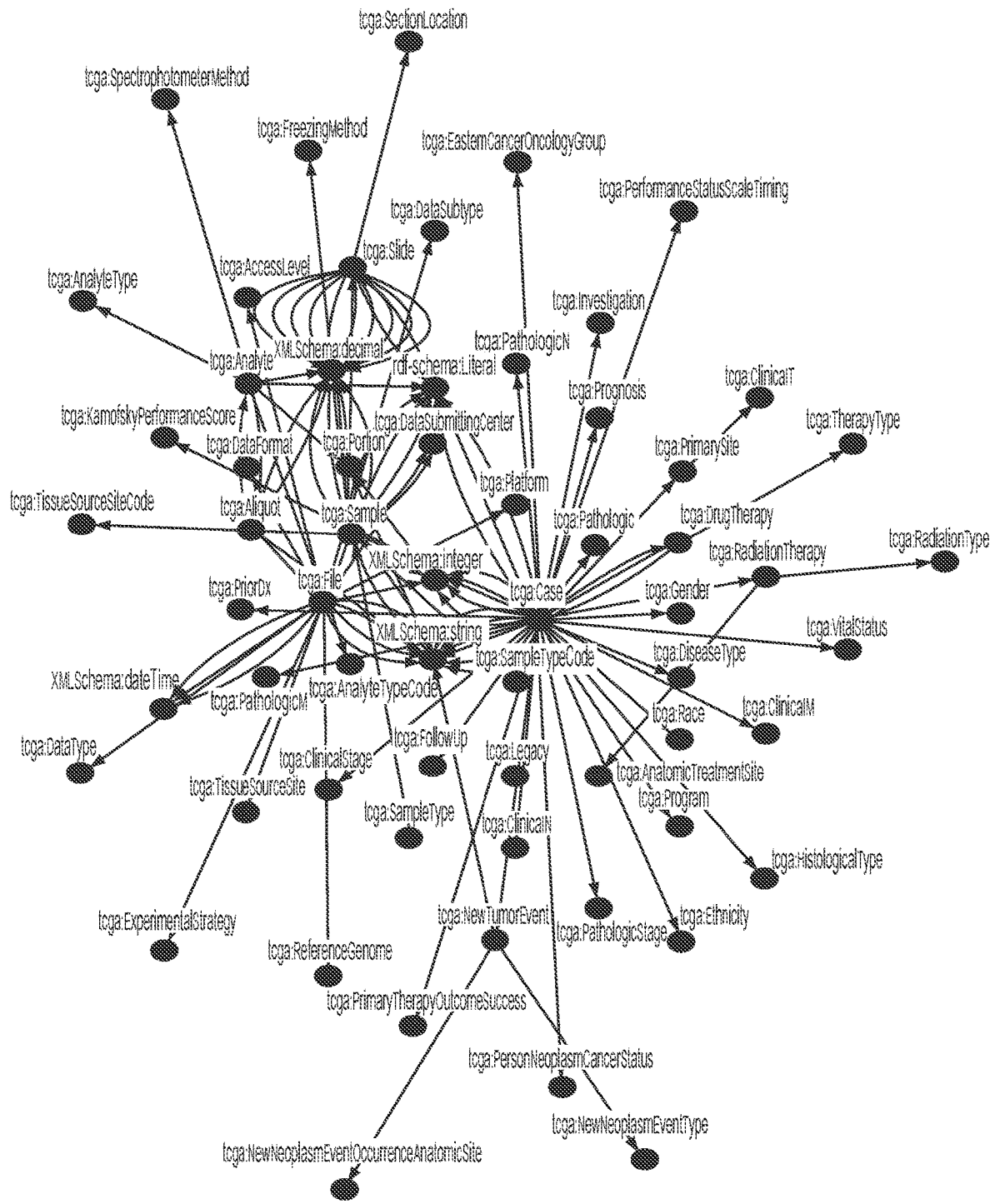
FIG. 2A is a block diagram depicting an embodiment of a graph of a data ontology.

Similarly, ease of querying may also be affected by the complexity of the data ontology. For example, FIG. 2A illustrates a graph of a data ontology defined for TCGA. This ontology includes 58 relationships between entities and 43 properties describing literal values for entities. A researcher designing a query for this dataset should be aware of each of the relationships and entities in the graph in order to write effective queries.

Populating an RDF-compatible graph database or RDF store can also be a challenge, given myriad different data sources and file types. In some embodiments, an Extract, Transform, Load (ETL) ontology may be created to assist with the loading of relevant data and metadata into the graph database such that it may be queried. In one of these embodiments, an ETL ontology can extend a base TCGA domain ontology with the "anchorOf" property to map metadata text fields with certain entities in the ontology. For example, the anchorOf property may be used to locate and extract values from specific XML tags in some cases for source XML, files. In another of these embodiments, properties such as rdfs:label and tcga:hasCode properties from the base domain ontology may be used to inspect the correctness for a vast number of Datatype and Object Properties during the ETL process.

As previously noted, some ontologies may integrate and interrelate data from a variety of sources. With a large amount of data from different sources, an ETL process can include complex operations to produce desired metadata from a data set. In some embodiments, an ETL ontology based pipeline tool carries out the extraction of relevant metadata from source files and subsequently uploads the resulting RDF data to a database server or exports it to RDF files. In one embodiment, the ETL tool is Python-based and works in three stages. In the first stage, the tool acquires files (in their dataset's original form) from a file system, extracts information (e.g., information of interest) and creates files containing specific entity data. These files are used as inputs for the second stage, in which the tool performs operations such as merging, adding, filtering and transforming. The ETL ontology is responsible for the detection, inspection and recording of entities, their properties and relationships. The second stage produces two types of files: files for domain entity instances (e.g., tcga:Case) and files for domain properties (e.g., tcga:hasSample). Domain entity files may include two columns: the entity type (e.g., tcga:Case) and the entity's identifier. Domain property files may include four columns: entity type and value for both domain and range of property in question. In the third stage, RDF data is produced by generating triples per-row for each file. The resulting RDF data is then uploaded to a database server instance (e.g., the database 350 discussed below) or stored in RDF files using the rdib library. The database server may deliver extracted data from two separate RDF stores: the ontology store and the knowledge base. In one embodiment, the ontology store is reserved for a query service ontology; it guides visual query building on the basis of dataset entity descriptions and relationships. In another embodiment, the knowledge base contains materialized data for all entities and relationships described within the ontology and contains a number of triples (e.g., in one embodiment, and without limitation, 16923234 triples); the majority of the triples represent relationships between domain entities and related files (e.g., triples with tcga:hasFile predicate), file related properties (tcga:hasDataFormat or tcga:hasStoragePath) and relationships between domain entities themselves (tcga:hasSample). Such distribution of properties is both expected and desired, taking into account the number of files and domain entity instances present in the dataset.

In one aspect, the methods and systems described herein provide improved functionality for visual creation of queries of an RDF data store. In one embodiment, the methods and systems described herein provide functionality for receiving, from a user, an identification of at least one entity described in a language other than a querying language (e.g., described using terms familiar to the user instead of an unfamiliar programming language, such as SPARQL) and for generating, based on the received identification, a query expressed in a querying language using descriptions of subjects, objects, and relationships that represent the identified entities and the relationships between them.

Figure 2B:
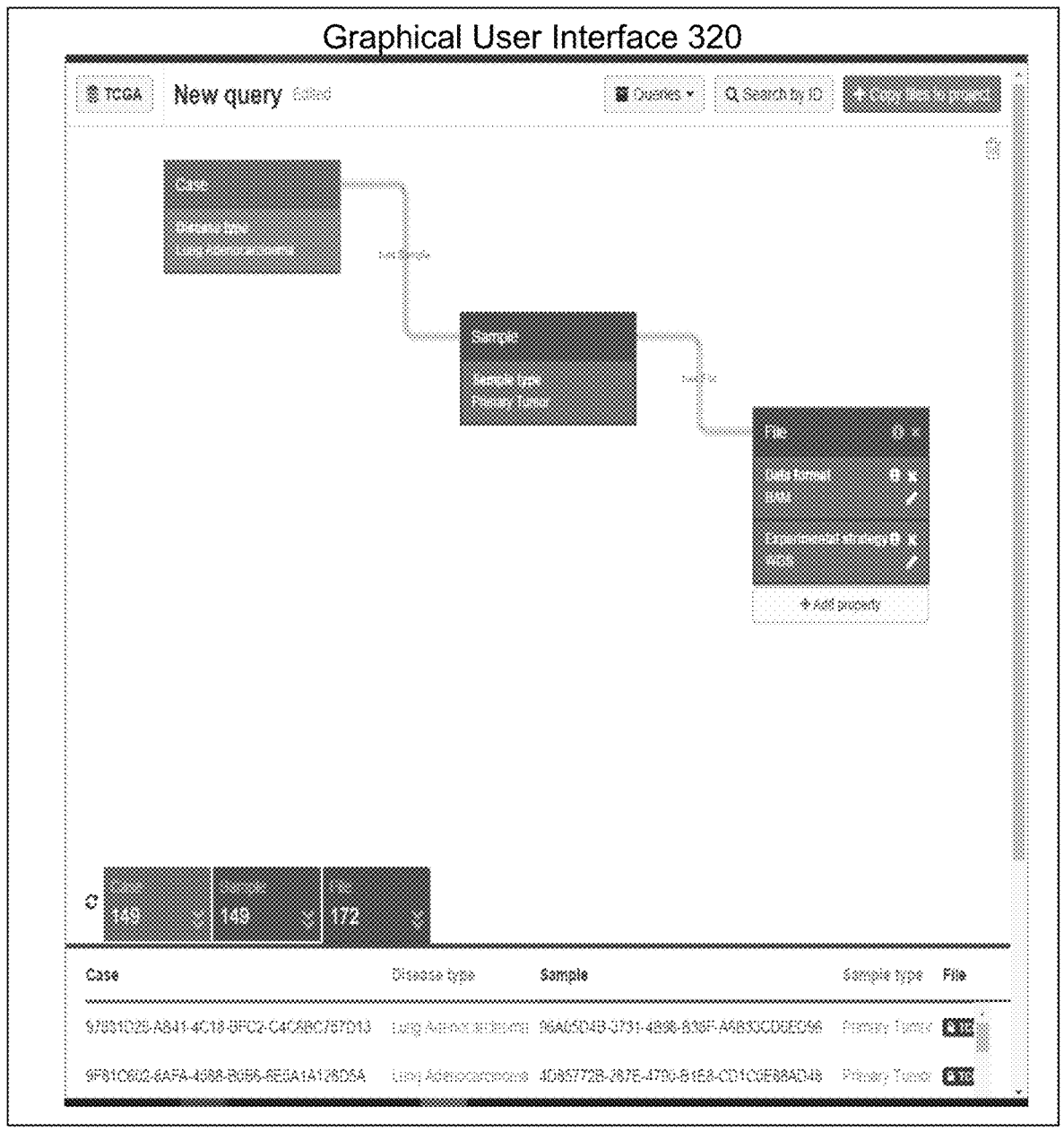
FIG. 2B is a block diagram depicting one embodiment of a human-readable graph within a user interface representing nodes for each of a plurality of entities.

Referring now to FIG. 2B, a block diagram depicts one embodiment of a human-readable graph within a user interface representing nodes for each of a plurality of entities of a first entity class. As will be discussed in further detail below in connection with FIG. 3, the methods and systems described herein may include a graphical user interface 320. As depicted in FIG. 2B the graphical user interface 320 may provide a visual representation of one or more nodes, each representing at least one entity, and allow users to create a visual representation of relationships between the nodes, from which the system may generate a SPARQL query. By way of example, and as shown in FIG. 2B, a user may instruct the system to generate a query in which a case has a disease type of Lung Adenocarcinoma, is associated with a sample from a primary tumor, and is associated with a file in a particular data format ("BAM") with a particular experimental strategy ("WGS"). From this input, the system may generate a query such as:

```
PREFIX bds: <http://www.bigdata.com/rdf/search#>
PREFIX rdf: <http://www.w3.org/1999/02/22-rdf-syntax-ns#>
PREFIX owl: <http://www.w3.org/2002/07/owl#>
PREFIX xsd: <http://www.w3.org/2001/XMLSchema#>
PREFIX rdfs: <http://www.w3.org/2000/01/rdf-schema#>
PREFIX tcga: <https://www.sbgenomics.com/ontologies/2014/11/tcga#>
SELECT DISTINCT ?case ?case_label ?case_disease_type_1
?case_disease_type_1_label ?sample ?sample_label ?sample_sample_type_1
?sample_sample_type_1_label ?file ?file_label ?file_access ?file_data_format_1
?file_data_format_1_label ?file_experimental_strategy_1
?file_experimental_strategy_1_label
WHERE
 { ?file tcga:hasDataFormat ?file_data_format_1 .
    ?file_data_format_1
        rdfs:label      ?file_data_format_1_label
    VALUES ?file_data_format_1 {
<https://www.sbgenomics.com/tcga/data_format/bam> }
    ?file   tcga:hasExperimentalStrategy ?file_experimental_strategy_1 .
    ?file_experimental_strategy_1
        rdfs:label      ?file_experimental_strategy_1_label
    VALUES ?file_experimental_strategy_1 {
<https://www.sbgenomics.com/tcga/experimental_strategy/wgs> }
    ?file   rdfs:label      ?file_label .
    ?sample tcga:hasFile      ?file ;
        tcga:hasSampleType ?sample_sample_type_1 .
    ?sample_sample_type_1
        rdfs:label      ?sample_sample_type_1_label
    VALUES ?sample_sample_type_1 {
<https://www.sbgenomics.com/tcga/sample_type/10> }
    ?sample rdfs:label      ?sample_label .
    ?case   tcga:hasSample    ?sample ;
        tcga:hasDiseaseType ?case_disease_type_1 .
    ?case_disease_type_1
        rdfs:label      ?case_disease_type_1_label
    VALUES ?case_disease_type_1 {
<https://www.sbgenomics.com/tcga/disease_type/luad> }
    ?case rdfs:label ?case_label ;
        rdf:type    tcga:Case
 }
OFFSET 0
LIMIT  50
```

In one embodiment, the methods and systems described herein provide functionality that allows a user to interact with a graphical user interface to identify entities and relationship types for inclusion in a query and that allows for the construction of the queries using metadata attributes of the entities as well as the identified entities and relationship types. In another embodiment, the methods and systems described herein provide functionality that analyzes connections between entity nodes in generating at least one interface for query generation. For example, selection of nodes which are connected to other nodes (e.g., selection of intermediary nodes that are not end points) results in a set of highly-connected nodes that have relationships with other highly-connected nodes, thus representing high level, or primary, entities within an ontology. These entities may be selected for inclusion with the first entity class. In contrast, end point nodes typically represent properties or characteristics of the entities of the first entity class. These entities may be selected for inclusion with the second entity class. By making available first entity class entities having bidirectional relationships with other first entity class entities, the methods and systems described herein may simplify the representation of an underlying ontology, and, by extension, simplify generation of a query of that ontology.

In some embodiments, a query service ontology is created to accommodate the requirements of visual querying of an RDF store. In one of these embodiments, the query service ontology supports the process of visual querying while the ETL ontology facilitates data import to designated stores. In another of these embodiments, these ontologies apply owl: import statements upon the base domain ontology, thus providing a common data model. In another of these embodiments, a query service ontology extends the base domain ontology with features intended to enable rapid visual querying and data retrieval. These features may include generic superclass properties (such as, "tcga:hasDiagnosis") and have a Datatype property (such as, "tcga:hasStoragePath"). Generic superclass properties may enhance the visual organization and grouping of available and related properties for an entity (like tcga:hasDiseaseType under tcga:hasDiagnosis). Datatype property tcga:hasStoragePath, for example, may enable users to gain direct access to files resulting from the visual query they are creating (e.g., within a front-end user interface) and subsequently use them on a cloud-based platform.

Figure 2C:
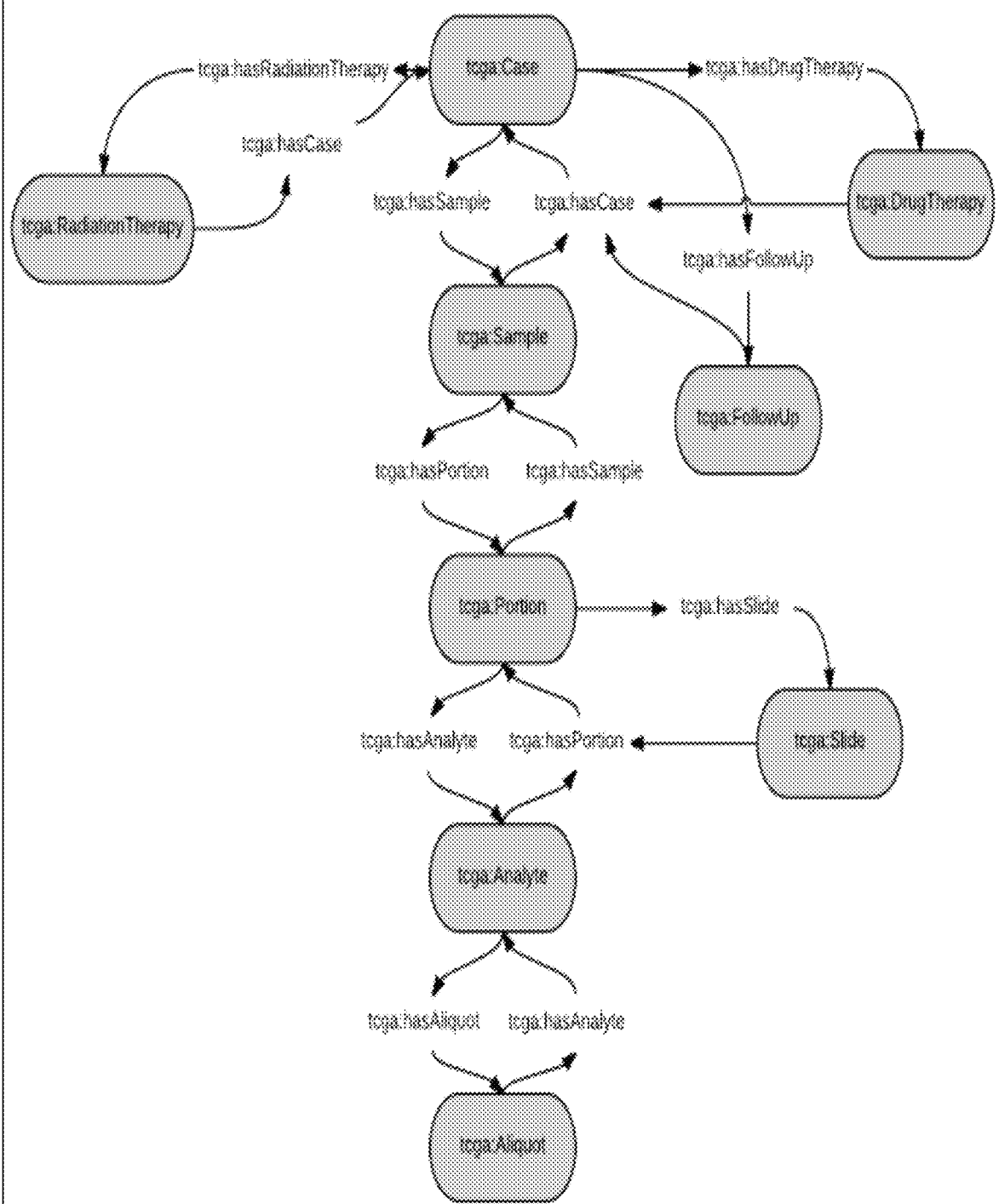
FIG. 2C is a block diagram depicting an embodiment of a plurality of related primary entities in a system for generating, by a query generator, a query of a genomic data store.

Referring now to FIG. 2C, a block diagram depicts one embodiment of a plurality of related first entity classes in a data ontology defined for, by way of example, TCGA. In this embodiment, the first entity classes are TCGAEntity classes. First entity classes may also be referred to as primary entities. As shown in FIG. 2C, first entity classes in the depicted data ontology include Cases (i.e., Patients), Therapies, Samples, and File, among others. Whereas the graph shown in FIG. 2A is quite complex, the graph of FIG. 2C is much more manageable for a user. Those of ordinary skill in the art will understand that other data sets will include alternative first entity classes and that those examples included here (in connection with an example including a genomic data set) are not limiting. In one embodiment, each first entity class has a bi-directional relationship to another first entity class. In another embodiment, the "Case" entity is bi-directionally connected to the "Radiation Therapy" entity by the relationships "has radiation therapy" and "has case." Similarly, each "Sample" has an associated "Case," and an associated "Portion," for which further relationships define connections to other entities. In still another embodiment, each first entity class may have a relationship with one or more second entity classes (which may also be referred to as property entities), represented by end nodes.

In one embodiment, the methods and systems described herein provide functionality for identifying instances of the first entity class and second entity class within a data set and for using the identified entities to generate a graphical user interface that simplifies the identification of components to use in a visual query and that automatically generates the visual query based up on the identified components. Distinguishing between first and second entity classes, and tight coupling of a visual query generation user interface to the ontological structure, may help to simplify searching using the visual query browser without any loss of searching ability.

Figure 3:
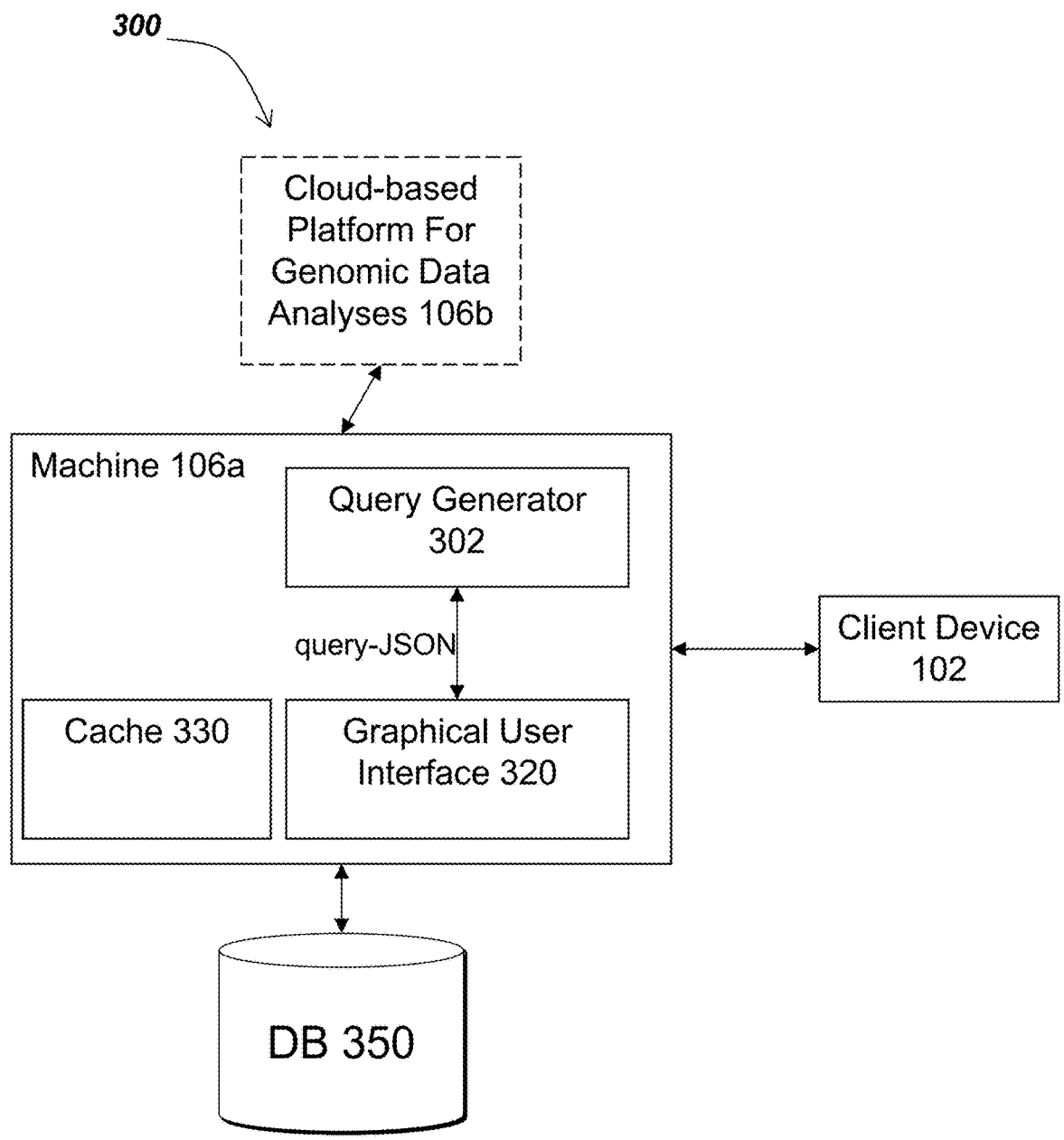
FIG. 3 is a block diagram depicting an embodiment of a system for generating, by a query generator, a query of a genomic data store.

Referring now to FIG. 3, a block diagram depicts one embodiment of a system for generating, via data received from graphical user interfaces, resource description framework queries. In brief overview, the system 300 includes a query generator 302, a graphical user interface 320, a cache 330, a database 350, a machine 106a, and a client device 102. The system 300 may also include a cloud-based platform for genomic data analyses 106b.

The client device 102 may be a client 102 as described above in connection with FIGS. 1A-C. The query generator 302 may execute on the machine 106a. The machines 106a-b may be machines 106, as described above in connection with FIGS. 1A-C. The machines 106 and client devices 102 may exchange data via networks 104 as described above in connection with FIGS. 1A-1C. The query generator 302 and the graphical user interface 320 may execute on the machine 106a.

Although for ease of discussion the query generator 302, the graphical user interface 320, the cache 330, the database 350 are described as separate modules, and only one of each is described, it should be understood that this does not restrict the architecture to a particular implementation. For instance, these modules may be encompassed by a single circuit or software function; alternatively, they may be distributed across a plurality of machines 100. It should be further understood that the system may provide multiple ones of any or each of those components.

In some embodiments, the query generator 302 is a software program. In other embodiments, the query generator 302 is a hardware module. The query generator 302 may also be referred to as a visual query builder 302.

In one embodiment, the query generator 302 includes functionality for translation. In another embodiment, the query generator 302 includes functionality for optimization. In still another embodiment, the query generator 302 includes functionality for aggregation. In yet another embodiment, the query generator 302 includes functionality for caching. The query generator 302 may include functionality for receiving an intermediate, or serialized, query from which it is to generate an RDF query.

In some embodiments, instead of, or in addition to, the query generator 302, the system provides a hypertext transfer protocol application programming interface (HTTP API) for accessing data. In other embodiments, instead of, or in addition to, the query generator 302, the system provides an open SPARQL endpoint for accessing data. Each of these components offers progressively lower levels of abstraction with respect to querying and presenting underlying data.

In some embodiments, the graphical user interface 320 is a software program. In other embodiments, the graphical user interface 320 is a hardware module. The graphical user interface 320 may be referred to as a front-end graphical user interface 320, or simply as the front end. In one embodiment, the graphical user interface 320 is accessed via a web browser (e.g., executed by a client 102). In another embodiment, the graphical user interface 320 may be accessed via the cloud-based platform for genomic data analyses 106b. In one embodiment, the front end, graphical user interface 320 is implemented in JavaScript and accesses a library to render the graphical representation of a query.

In some embodiments, the cache 330 is a software program. In other embodiments, the cache 330 is a hardware module.

In one embodiment, the database 350 is an ultra-scalable, high-performance graph database with support for RDF/SPARQL Application Programing Interfaces; for example, the database 350 may be a BLAZEGRAPH database, provided by Systap, LLC, of Washington, D.C. In other embodiments, the database 350 may be any form or type of database.

In some embodiments, a computing device including at least one processor provides functionality for receiving, via a graphical user interface, identifications of entities, attributes, and relationships between entities (none of which are in an RDF querying language), for generating an intermediate query (e.g., a serialized, JSON query), and for generating an RDF query, which the computing device then executes to retrieve search results and update a display to the user. In one of these embodiments, the computing device updates a display on a monitor or other input/output device physically connecting to the computing device. In another of these embodiments, the computing device transmits data, via a computer network (such as the network 104), to a second computing device, allowing the second computing device to modify a display to include a representation of the search results by a monitor or other input/output device physically connecting to the computing device.

Figure 4:
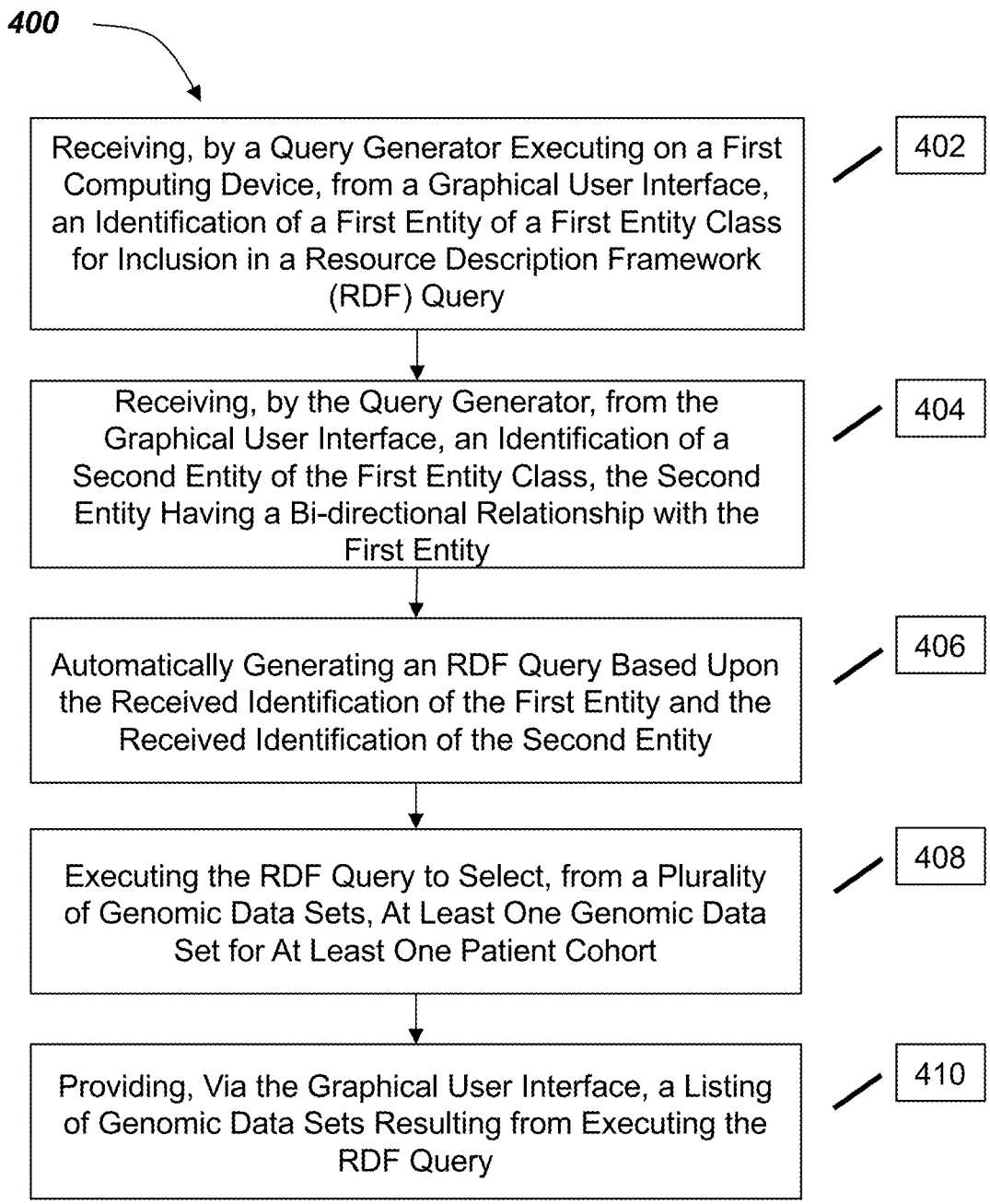
FIG. 4 is a flow diagram depicting an embodiment of a method for generating, by a query generator, a query of a genomic data store.

Referring now to FIG. 4, a flow diagram depicts one embodiment of a method 400 for generating, via data received from graphical user interfaces, resource description framework queries. In brief overview, the method 400 includes receiving, by a query generator executing on a computing device, from a graphical user interface, an identification of a first entity of a first entity class for inclusion in a resource description framework (RDF) query (402). The method 400 includes receiving, by the query generator, from the graphical user interface, an identification of a second entity of the first entity class having a bi-directional relationship with the first entity (404). The method 400 includes automatically generating, by the query generator, an RDF query, based upon the received identification of the first entity and the received identification of the second entity (406). The method 400 includes executing the RDF query to select, from a plurality of genomic data sets, at least one genomic data set for at least one patient cohort (408). The method 400 includes providing, via the graphical user interface, a listing of genomic data sets resulting from executing the RDF query (410).

Referring now to FIG. 4 in greater detail, and in connection with FIGS. 2 and 3, the method 400 includes receiving, by a query generator executing on a computing device, from a graphical user interface, an identification of a first entity of a first entity class for inclusion in a resource description framework (RDF) query (402). The method 400 includes receiving, by the query generator, from the graphical user interface, an identification of a second entity of the first entity class having a bi-directional relationship with the first entity (404). The first entity class may include instances of entities with a central role in analysis and investigation, such as instances of the TCGAEntity class in the TCGA Data Ontology.

In one embodiment, prior to receiving the identification of the first entity, the query generator 302 receives initialization information. For example, the query generator 302 may receive a list of entities, their relationships, and any additional information available (such as URIs to RDF schemas describing the ontology). The initialization information may include information needed to build a visual query, by selecting entities as nodes, utilities as node properties, and relationships between entities as edges to create the graph.

In one embodiment, the query generator 302 prepares a configuration based on a context. The context may be the current ontology and the data store to be queried. The query generator 302 may identify a context of the intermediate, serialized query (e.g., by analyzing code within the JSON query or by analyzing a method in which the serialized query was received, such as by identifying which URL was accessed in transferring the JSON query). In one embodiment, the context-based configuration contains information for building queries. This context-based configuration may include encapsulation information needed in order to work with appropriate data sets. The context may provide ontology mappings between concepts; this will also assist the graphical user interface 320 to access the mappings in order to identify which entities can be connected to which other entities in other datasets, allowing users to construct federated multi-dataset queries. This context-based configuration may provide locations of RDF stores and SPARQL endpoints where data resides, as well as specific optimizations or statements to be included in particular generated queries (e.g., the user interface 320 generating the intermediate, serialized, JSON query may have received this information from the initialization information and included it in the JSON query, where it will be available to the query generator 302). In one embodiment, the context-based configuration includes the entities a user may connect to form a query (e.g., instances of TCGAEntity subclasses in the case of TCGA), their properties, as well as ancillary data that may be used for visually implementing the queries (for example, the current color scheme representing different entities).

In one embodiment, the query generator 302 receives, via the graphical user interface 320, the identification of the first entity without receiving an identification of an RDF query component. In one embodiment, the user constructs queries by connecting visual representations of nodes corresponding to entities available from the starting configuration. As previously mentioned, in some embodiments, these entities are instances of a first entity class (e.g., the TCGAEntity class); each connection represents a connection to the associated object property from the ontology and the starting and ending entities are its domain and range, respectively. As indicated above, queries may include entities defined by the TCGA ontology, including, without limitation, Case, File, Sample, Portion, Slide, Analyte, Aliquot, Drug Therapy, Radiation Therapy, and Follow Up. Instances of a second or utility class (e.g., the TCGAUtility class) may be treated as attributes or properties of an entity instance from the first class and may be listed below the appropriate entity node in the display generated by the graphical user interface 320. In one embodiment, the front-end graphical user interface 320 is implemented in JavaScript and accesses a library to render the graphical representation of a query. As shown in FIG. 2B and in the sample query accompanying the description of FIG. 2B, the graphical representations of the entities of the first class assist in visually distinguishing utilities (attributes, or properties) from entities of the first class.

The method 400 includes automatically generating, by the query generator, an RDF query, based upon the received identification of the first entity and the received identification of the second entity (406). In one embodiment, the query generator 302 generates a SPARQL query. In another embodiment, the query generator 302 generates a SPARQL query comprising at least one subject describing one of the first entity and the second entity. The query generator 302 may select a subject that is associated with an entity; for example, by accessing an ontology mapping from the context-based configuration. In still another embodiment, the query generator 302 generates a SPARQL query including at least one object describing one of the first entity and the second entity. The query generator 302 may select an object that is associated with an entity; for example, by accessing an ontology mapping from the context-based configuration.

In one embodiment, the query generator 302 receives an intermediate query (also referred to as a serialized query, a JSON query, or a query-JSON) from the user interface 320 and the query generator 302 uses this to generate the RDF query. For example, in some embodiments a JavaScript Object Notation (JSON) protocol is defined between the front-end user interface 320 and the query generator 302 that captures information about a current query and its context; in such an embodiment, the front-end user interface 320 serializes the graphical query representation into this protocol-defined query-JSON. That is, the front-end user interface 320 uses the information provided by the users (e.g., identifications of entities and relationships between entities) to generate a JSON query that the query generator 302 may use to generate a SPARQL query, which it may execute to identify and provide results for display to the user via the front-end user interface 320. By way of example, if the user interface 320 receives an identification of an entity that is a sample having a particular country of procurement and associated with a particular case, the user interface 320 may generate the following intermediate query:

```
{
  "context":"tcga",
  "entities":[
  {
  "id":"205164",
  "name":"sample",
  "label":"Sample",
  "type":{
```

```
        "type":"entity",
        "uri":"https://www.sbgenomics.com/ontologies/2014/11/tcga#Sample"
      },
      "parent":false,
      "children":[
        "463771"
      ],
      "selected":true,
      "filter":{
      },
      "properties":[
        {
          "connection":{
            "property":"https://www.sbgenomics.com/ontologies/2014/11/tcga#hasCountryOf
SampleProcurement",
            "propertyType":"http://www.w3.org/2002/07/owl#DatatypeProperty"
          },
          "name":"country_of_sample_procurement_1",
          "type":{
            "uri":"http://www.w3.org/2001/XMLSchema#string",
            "type":"string"
          },
          "label":"Country of sample procurement",
          "filter":{
            "type":"string",
            "value":[
            ],
            "match":"exact"
          }
        }
      ]
    },
    {
      "id":"463771",
      "name":"case",
      "label":"Case",
      "type":{
        "type":"entity",
        "uri":"https://www.sbgenomics.com/ontologies/2014/11/tcga#Case"
      },
      "parent":205164,
      "children":[
      ],
      "selected":false,
      "filter":{
        "type":"instance",
        "match":"matchAny",
        "value":[
          {
            "uri":"https://www.sbgenomics.com/tcga/case/001944E5-AF34-4061-9C09-
BB9EA346F6FD",
            "label":"001944E5-AF34-4061-9C09-BB9EA346F6FD"
          },
          {
            "uri":"https://www.sbgenomics.com/tcga/case/0024AB57-4036-4B0F-B7A1-
040F97787022",
            "label":"0024AB57-4036-4B0F-B7A1-040F97787022"
          },
          {
            "uri":"https://www.sbgenomics.com/tcga/case/00EE3098-1B32-4E7A-81EA-
993773587C41",
            "label":"00EE3098-1B32-4E7A-81EA-993773587C41"
          }
        ]
      },
      "properties":[
      ],
      "connection":{
        "parent":205164,
        "property":"https://www.sbgenomics.com/ontologies/2014/11/tcga#hasCase",
        "propertyType":"http://www.w3.org/2002/07/owl#ObjectProperty"
      }
    }
  ],
  "offset":0,
  "limit":50
}
```

Once the serialized query is transferred to the query generator 302, the serialized query goes through several phases. First, in a translation phase, the serialized query is converted to the SPARQL format. The query generator 302 may identify a context of the serialized query (e.g., by analyzing code within the JSON query or by analyzing a method in which the serialized query was received, such as by identifying which URL was accessed in transferring the JSON query). The query generator 302 may use the context to identify an ontology used for the JSON query. The query generator 302 may use the context to determine how to translate the JSON query into SPARQL. The query generator 302 may use the context to identify a SPARQL endpoint to use for the translated query.

In one embodiment, translation of the serialized query is accomplished by creating a SPARQL query builder, a Python library inspired by Java's Criteria API. The SPARQL query builder may receive the serialized query (e.g., the JSON query) and convert the serialized query into a Python object. The Python object may be a deserialized JSON query. The query generator 302 may use a query builder library to create the query by reading through each field in the JSON query (e.g., properties, entities, relationships) and their corresponding URIs (which may, for example, describe associated RDF schemas). The query generator 302 may identify a type from a URI corresponding to a field in the JSON query. The query generator 302 may identify a relationship by reading "children" and "properties" keys within the JSON query (e.g., as shown in the JSON query above). The query generator 302 may use this information (e.g., the fields, URIs, and information from the query builder library) to generate a SPARQL query. As will be understood by those of ordinary skill in the art, an ontology itself does not necessarily include explicit translation instructions; it is used as a guide, by providing the kinds of information needed to build the query JSON. Rather, translation is performed by the query generator 302, which generates the RDF query based on the query JSON and relationships defined therein.

Additionally, during this phase, the query may be enriched by additional SPARQL statements dictated by the context. For example, and without limitation, one requirement that may be imposed for a particular dataset (e.g., the TCGA dataset) may specify that whenever a query includes a File entity, the query should contain information about an access level of the file (i.e. whether the data is "Controlled" or "Open"); this may be accomplished, for example, by a rule bound to a "TCGA" context that includes a property (such as, for example, "tcga:hasAccessLevel" property) on each tcga:File.

In one embodiment, the method 400 includes receiving an identification of each of a plurality of entities, each of the plurality of entities having a bi-directional relationship with at least one of the first entity and the second entity. In such an embodiment, the method 400 may include re-generating the RDF query based upon receiving the identification of each of the plurality of entities. Each entity of the plurality of entities may be, for example, instances of a first entity class, such as the TCGAEntity class in the TCGA data ontology.

In one embodiment, the method 400 includes receiving an identification of at least one property of at least one of the first entity and the second entity. The property may be an entity (e.g., a third entity) of a second entity class. In such an embodiment, the method 400 may include re-generating the RDF query based upon receiving the identification of the at least one property. In one embodiment, when a new attribute is added, the corresponding property is automatically added to the resulting query. Each entity may be filtered; discrete values representing identifiers (e.g., TCGA identifiers) may be selected to more precisely define the results. Each property or attribute may be instances of a second entity class, such as the TCGAUtility class in the TCGA data ontology.

In one embodiment, the method 400 includes displaying, by the first computing device, in the graphical user interface, a menu of properties for association with the first entity. In another embodiment, the method 400 includes dynamically generating, by the first computing device, a menu for display by the graphical user interface, based upon receiving the identification of at least one of the first entity and the second entity. The dynamic displays may be accomplished through multiple executions of a query even before a user has indicated that she has completed identifying entities, attributes, and relationships to include in the query.

In one embodiment, the method 400 includes displaying, by the first computing device, a displayed menu in the graphical user interface, the menu including an enumeration of a plurality of entities capable of having a bi-directional relationship with the first entity. In such an embodiment, the method 400 may include receiving, by the first computing device, an identification of at least one property of the first entity; and modifying, by the first computing device, the displayed menu based upon the received identification of the at least one property of the first entity. In such an embodiment, the method 400 may include removing an identification of an entity based upon the received identification of the at least one property of the first entity. In such an embodiment, the method 400 may include dynamically re-generating the RDF query based upon the received identification. The dynamic displays may be accomplished through multiple executions of a query even before a user has indicated that he has completed identifying entities, attributes, and relationships to include in the query.

Queries may be executed multiple times while the visual query is being built, even when the user does not explicitly hit "submit". For example, the user interface 320 can display statistics about the current query that can help guide the user towards making valid choices, such as the number of results that would be returned, and possible/unique values for certain parameters (with corresponding counts). This may give the user a sense of how possible query modifications would affect the number of results. These values may be updated in real time as the query is being built. Each of these sub-queries may be performed by re-using the current JSON query. However, the query may be modified to return just the information needed, such as a DISTINCT clause to only provide unique values, or a COUNT clause to give the number of results. In some embodiments, this execution results in a significant drop in performance; therefore, the system 300 may perform a number of optimizations to mitigate the impact on performance. These optimizations may include: 1) removing additional fields that are irrelevant for the purpose of the subquery, like labels, file locations, etc.; 2) applying RDF query optimizations, like the use of VALUES and FILTERS clauses over UNION statements when there are a large number of values to filter; 3) further breaking down the query into smaller subqueries; and 4) using optimizations provided or suggested by the DBMS. Regarding (4), Blazegraph offers "query hints" that can help optimize the query; this could include setting a particular parameter known to work well for a particular query, such as "chunkSize=850". One optimization this is particularly useful in the context of large genomics data storage relates to the fact that each query is ultimately used to identify a set of files, which include data such as a list of genomic variants for an individual, sequencing results, etc. In the defined TCGA ontology, for example, every Sample always has an associated File. When counting a Sample query or finding filter values, the triple "Sample hasFile File" does not affect the result, so one can ignore this or remove it from the query. This means that the DBMS does not have to query the same number of Files as Samples. Situations like this may occur at various places in an ontology. These situations may be identified, and then stored in a look-up table such that the system can ignore redundant relationships that don't meaningfully impact counts (COUNT) or unique value (DISTINCT) queries.

The method 400 includes executing the RDF query to select, from a plurality of genomic data sets, at least one genomic data set for at least one patient cohort (408). In one embodiment, after the translation phase, the query is executed on the endpoints associated to the current dataset by the query's context. Executing the RDF query may result in a list of samples. Executing the RDF query may result in a list of patients. Executing the RDF query may result in a list of first entities. Executing the RDF query may result in a set of files for the at least one patient cohort, which may then be provided to the cloud-based platform 106b (e.g., for further analysis). The results may be returned to the graphical user interface 320 in JSON format.

Aggregation refers to a process of merging the results of one or many subqueries into a result JSON that may then be transferred back to the user interface 320. In one embodiment, a result has the results of the main query (i.e., the one the user is building); however, it also may have information in it related to other features of the query, such as the current number of counts, and the other sub-queries described above. The results of these sub-queries are aggregated and used to populate parts of the result. So, the result includes data that is transformed and adapted from what was initially received. There are a few other instances in which the system 300 aggregates data, related to other user interface elements. For example, in one embodiment the system 300 has a "data overview" page that performs a number of queries to give some useful statistics about the database (e.g., number of tools available, number of files, number of patients, etc.). The system 300 may display data about diseases in the database, or other statistics associated with that data. This type of data comes from multiple queries that are then aggregated for the user interface 320 to display.

Aggregation may also be used when allowing a user to copy files to their own projects (e.g., on their own computing devices or cloud computing services). This can be difficult, because before files can be copied to a project (such as on the cloud platform 106b), several queries may need to execute to confirm that the copy is authorized. For example, queries may ask questions such as: How many files are there? How many files do you have access to given your permission level? Which files are visible based on the query? Queries such as these may be performed in parallel to reduce execution time. In any case, the result communicated back to the front end or user interface 302 can include the results of several queries, which may then be aggregated into a single set.

The method 400 includes providing, via the graphical user interface, a listing of genomic data sets resulting from executing the RDF query (410). In one embodiment, the resulting data, in JSON format, is sent to the front end to be displayed on the graphical user interface 320. Once the data is displayed, users are able to extract the relevant files from it and import them to one of their projects on the cloud-based platform 106b.

In one embodiment, the results are cached using an algorithm that rearranges query statements in a predetermined order and generates a caching key using this "canonical" form of the query. In some embodiments, this mechanism may be expanded upon by implementing an adaptive caching system. In one of these embodiments, the system identifies queries that are structurally different but semantically the same and re-uses cached results.

The system 300 may include one or more caches. In one embodiment, the system 300 uses a local storage provided by a web browser application as a cache for the user interface 320. This may enable the user interface 320 to perform fewer requests to the query generator 302 if the data cached in the user's browser is sufficient. For example, an initial list of entities (which may be transferred to the user interface 320 via an init-JSON) can be stored in the local storage of the user's browser. On a refresh of the page, this data does not need to be loaded from the server. The frontend cache can also store intermediate results. For example, if a user requests a set of filters for the same entity for the same query (perhaps for testing out options), this information is stored locally so that the user interface 320 does not need to re-query the service a second time. This helps improve performance on the user interface 320 and reduces load on the query generator 302.

In another embodiment, the system 300 provides a cache 330 that stores queries and the associated results. The system 300 may include functionality for identifying queries that are semantically the same (and therefore have the same results) but are structurally different (e.g., different set of nodes or combinations of nodes in the visual query). As described above, the translation process builds a Python object from the JSON query. The system 300 includes functionality for comparing these Python objects (e.g., with previously-generated Python objects stored in a cache) to determine whether they would generate the same results; if so, the query generator 302 can retrieve the results from the cache 330 without having to execute the query again.

As previously mentioned, a user can filter or constrain the results of a query by selecting discrete values for properties associated with those entities in the query. These filters may be dynamic and take into account all previously selected properties and filters across the whole query. This allows the user to determine which filters will produce results and avoid selecting a filter for which no matching entries would be returned. These filter choices are produced dynamically by reusing the same query-JSON of the current query. The difference is in the SELECT clause, in which the desired entity and its label are modified to be under a DISTINCT selection. In addition to filters, and ordinary results, each query provides statistics in the form of counts of constituent entities. Users can follow how query modifications impact the total number of entities affected. The COUNT SPARQL queries are created by the same process as for the ordinary queries, but with certain modifications.

In some embodiments, the system 300 is optimized to improve performance when executing queries with filters (e.g., when creating COUNT and DISTINCT queries). As the primary entities and property entities are added as nodes in each step, the range of available properties for filtering the data set is narrowed, which presents an issue because some properties may no longer be present in the data set, and thus selecting for them will yield no results. In one of these embodiments, the query generator 302 dynamically validates each of the available options by executing subqueries in order to determine and selectively show only those appropriate options still available. For example, the query generator 302 may only show available options for certain properties (i.e., there is at least one result for that property in the present query) for filtering a disease type or a sample type. Similarly, the query generator 302 may also dynamically list only those entities or properties that are currently available or possible for the current query. For example, if there are no files available for the current query, then "has file" may no longer be listed as an option for the "Sample" property. In this way, the query generator 302 is configured to dynamically constrain the available options for further narrowing the query. In another of these embodiments, the system 300 includes a look up table that states which properties do not restrict their domain class results—that is, the query generator 302 is dynamic and evaluates the query as the diagram is updated to show only those filters that are available. Thus, when a query-JSON is translated to a COUNT or DISTINCT filter query, the query generator 302 may consult this table to eliminate unnecessary triples. Starting from the leaf nodes of the query-JSON, each relationship between a node and its parent is examined; if their connecting property is present in the look up table and there are no filters defined for either of them, they are removed.

Queries may also be constrained in other ways. In particular, constraints are useful to generally improve query response time and user experience, as fewer unnecessary nodes are included in the query. For example, certain tumor-specific properties may only be visible when a specific tumor site has been selected. In certain examples, nodes can be conditionally propagated. For example, if "BAM" is chosen as a desired data format, the UI may trigger the addition of a "Reference Genome" property (and vice versa), giving the user an option to identify the particular reference genome in order to narrow down searching and filtering.

In some embodiments, options in filters can be sorted by weighting different items regarding various metrics. For example, these metrics can include the page rank of items in the filter; relatedness with already chosen items measured from a publications corpus; the usage frequency of items in the filter. Metrics can also include a measure of similarity to identify like patients. For example, the top 10 patients similar to a chosen patient in the given graph query could be identified, where similarity is measured by so other criteria (e.g., age, performance status score, sample dimensions, and the like).

The following illustrative example shows how the methods and systems discussed above can be used to build queries. This example is meant to illustrate and not to limit the invention. In one embodiment, the graphical user interface 320 displays a menu from which a user may select a first entity of a first entity class. By way of example, the user may select a Case entity and this selection will cause the graphical user interface 320 to create a primary node representing the Case entity, which may be displayed in a query field or other portion of the user interface 320. At this stage, executing the query would yield data for all Cases within the RDF store, so the user further refines the query by adding additional nodes. Selecting the visual representation of the Case entity causes the graphical user interface 320 to generate a menu of available refinements that can be made to the query by adding new primary nodes (of entities of the first entity class) and property attributes (of entities of the second entity class). Certain menu entries reflect those primary entities which have triple statements associated with the current entity (i.e., those entities having bi-directional relationships with other entities, as shown in the ontology); these entities may be represented in a different visual form than other menu items (e.g., in a different color, font, or style). For example, the "Case" entity may have Drug Therapy, File, Follow Up, Radiation Therapy, and Sample as available options, because the Case entity has defined relationships with these other entities of the first entity class. Continuing with this example, if the user selects the "Has Sample" menu option for the Case entity, the graphical user interface 320 creates a node to represent Sample. From the Sample node, the user can then select the "Has File" menu option to add a new node for File. For each node, the system may generate a menu whose contents are dynamically updated based upon which other entities are related and which other properties are applicable to the entity selected.

Continuing with this example, the selections above result in a representation of a Case entity that has a relationship of "has Sample" with a Sample Entity, which in turn has a "has File" relationship with a File entity. The selections may be visually represented as a graph. In one embodiment, the graph is generated based upon entities that are represented in a language other than a querying language—that is, not based upon selection by the user of SPARQL terms for use in generating a SPARQL query. The query generated by the graph will retrieve all triple relationships in which the triples "case has sample" and "sample has file" are present. In this way, the query builder creates a query diagram that has dimensionality; read left-to-right, the query will retrieve all records for cases which have samples which have associated files.

Continuing with the example above, and in one embodiment, the menus available upon selection of entities display not only the entities with which the selected entity of the first entity class may connect but also properties of the selected entity; these properties may be represented in a different visual form than other menu items (e.g., in a different color, font, or style). The graphical user interface 320 therefore allows a user to further narrow the scope of the query by specifying constraints on the properties of any of the primary entities presently reflected in the query. For example, a researcher may be interested in only those cases for a particular form of cancer, such as Lung Adenocarcinoma. Using the graphical user interface 320, such a researcher can select the relevant property entity by selecting the Case node and identifying the "Has Disease Type" relationship. This creates an attribute or property for the Case node representing the Disease or Diseases for which the researcher would like to refine the query. Once a new relationship has been set between two entities, a user may select an "add filter" interface element to specify a filter (such as a disease in a data set) for which the user wishes to narrow the query. When the "add filter" interface element is selected, the graphical user interface 320 populates a menu with all available diseases in the data set. The researcher may then select "Lung Adenocarcinoma" disease and the query generator 302 will update the query so that executing the query will return all data within the data set related to patients having Lung Adenocarcinoma.

Continuing with the example above, further refinements to the query may be made. For example, a researcher could restrict samples to only those from a primary tumor. This can be done by refining the available samples, i.e., by selecting the Sample node and selecting the "Has Sample Type" relationship to create a new attribute from the Sample node representing Sample Type. The desired sample type (primary tumor) may then be selected from the filter for the Sample Type attribute.

Continuing with the example above, additional filters may be specified. Filters may be any data type, such as enumerated strings, a typed string, numbers, dates, and the like. As noted above, the TCGA is a rich genomic data set which includes large files related to sequencing analyses, along with associated metadata. In practice, the query generator 302 may be used to select genomic data sets for a particular cohort of patients. The genomic data sets can be restricted to particular data formats. For example, a user may restrict those files yielded by the query to be only those in which Whole Genome Sequencing (WGS) was performed, for which those results are aligned to the human genome and stored in BAM format. FIG. 2B illustrates the visual query at this stage. On the full TCGA data set, such a query may result in 172 unique BAM files. Each BAM file represents a whole genome sequencing data from a unique patient with lung adenocarcinoma. Using the cloud platform 106b, these files may subsequently be analyzed to generate new discoveries.

In some embodiments, the query filter also features a simplified user interface that eases the process of querying for researchers; no drop-down boxes, check boxes, or drag-and-drop actions are required. The researcher simply selects those entities and properties for which he or she wishes to design the query. Further, as the researcher selects entities, only those which are hierarchically closest to the present entity are available as options; this is a result of the user interface being tightly coupled to the ontology structure.

In one embodiment of a system and method using the query generator 302 and employing the use of entities and properties, nodes represent entities and edges represent relationships. Entities define characteristics of their linked entities that can be used to refine a query. In use, a researcher builds the query diagram by first creating a node representing an entity of a first entity class, such as Case. The researcher may then build on the query by adding a property (such as Disease Type) and specifying a filter for that property that limits the entity of the first entity class. The researcher may further add new entities of the first entity class, such as Sample and File, and additional properties (of the second entity class) from those. The query generator 302 then converts the result into a SPARQL query, which then selects relevant records from the RDF store.

Although many of the examples provided herein describe the use of the methods and systems described herein in connection with TCGA, it should be understood that these are non-limiting examples and that the methods and systems described herein may be used in connection with any data store.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. However, such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program (e.g., computer program instructions) stored (e.g., tangibly embodied on) a non-transitory computer-readable medium to perform functions of the invention by operating on input and generating output. Processors are, or may include, at least one circuit (including, e.g., logical circuitry). Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for generating, by a visual query builder, a query of a genomic data store, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for generating, via data received from graphical user interfaces, resource description framework queries, the method comprising:
   receiving, by a query generator executing on a first computing device, from a graphical user interface, an identification of a first entity of a first entity class for inclusion in a resource description framework (RDF) query;
   displaying, by the first computing device, a menu in the graphical user interface, the menu including an enumeration of a plurality of entities capable of having a bi-directional relationship with the first entity;
   receiving, by the query generator, from the graphical user interface, an identification of a second entity of the first entity class having a bi-directional relationship with the first entity;
   automatically generating, by the query generator, an RDF query based upon the received identification of the first entity and the received identification of the second entity;
   executing the RDF query to select, from a plurality of genomic data sets, at least one genomic data set for at least one patient cohort; and
   providing, via the graphical user interface, a listing of genomic data sets resulting from executing the RDF query.

2. The method of claim 1 further comprising receiving an identification of each of a plurality of entities of the first entity class, each of the plurality of entities having a bi-directional relationship with at least one of the first entity and the second entity.

3. The method of claim 2 further comprising re-generating the RDF query based upon receiving the identification of each of the plurality of entities.

4. The method of claim 1 further comprising receiving an identification of at least one property of at least one of the first entity and the second entity.

5. The method of claim 4, wherein the at least one property comprises a third entity of a second entity class.

6. The method of claim 4 further comprising re-generating the RDF query based upon receiving the identification of the at least one property.

7. The method of claim 1 further comprising displaying, by the first computing device, in the graphical user interface, a menu of properties for association with the first entity.

8. The method of claim 1 further comprising dynamically generating, by the first computing device, a menu for display by the graphical user interface, based upon receiving the identification of at least one of the first entity and the second entity.

9. The method of claim 1 further comprising:
   receiving, by the first computing device, an identification of at least one property of the first entity;
   modifying, by the first computing device, the displayed menu based upon the received identification of the at least one property of the first entity.

10. The method of claim 9, wherein modifying further comprises removing an identification of an entity based upon the received identification of the at least one property of the first entity.

11. The method of claim 9 further comprising dynamically re-generating the RDF query based upon the received identification.

12. The method of claim 1 wherein receiving the identification of the first entity further comprises receiving the identification without receiving an identification of RDF query components.

13. The method of claim 1, wherein automatically generating an RDF query further comprises generating a SPARQL query.

14. The method of claim 1, wherein automatically generating an RDF query further comprises generating a SPARQL query comprising at least one subject describing one of the first entity and the second entity.

15. The method of claim 1, wherein automatically generating an RDF query further comprises generating a SPARQL query comprising at least one object describing one of the first entity and the second entity.

16. A computer-readable medium comprising computer-readable instructions tangibly stored on the computer-readable medium, wherein the instructions are executable by at least one computer processor to execute a method for use with a system, wherein the method comprises:
   receiving, by a query generator executing on a computing device, from a graphical user interface, an identification of a first entity of a first entity class for inclusion in a resource description framework (RDF) query;
   displaying, by the query generator, a menu in the graphical user interface, the menu including an enumeration of a plurality of entities capable of having a bi-directional relationship with the first entity;
   receiving, by the query generator, from the graphical user interface, an identification of a second entity of the first entity class having a bi-directional relationship with the first entity;
   automatically generating an RDF query based upon the received identification of the first entity and the received identification of the second entity;
   executing the RDF query to select, from a plurality of genomic data sets, at least one genomic data set for at least one patient cohort; and
   providing, via the graphical user interface, a listing of genomic data sets resulting from executing the RDF query.

* * * * *

UNITED STATES PATENT AND TRADEMARK OFFICE
CERTIFICATE OF CORRECTION

PATENT NO. : 10,545,955 B2
APPLICATION NO. : 15/405474
DATED : January 28, 2020
INVENTOR(S) : Djordjevic et al.

Page 1 of 1

It is certified that error appears in the above-identified patent and that said Letters Patent is hereby corrected as shown below:

In the Drawings

In Sheet 3 of 8, FIG. 1C, for Tag "130a-n" delete "I/O Device" and insert -- I/O Devices --, therefor.

Signed and Sealed this
Twelfth Day of May, 2020

Andrei Iancu
*Director of the United States Patent and Trademark Office*